May 7, 1963

J. P. FRANCIS 3,088,772

RETRACTABLE WINDSHIELD AWNING
AND SUPPORTING MEANS THEREFOR

Filed Nov. 15, 1960

INVENTOR

John P. Francis

United States Patent Office 3,088,772
Patented May 7, 1963

3,088,772
RETRACTABLE WINDSHIELD AWNING AND
SUPPORTING MEANS THEREFOR
John P. Francis, 20 Boston St., Haverhill, Mass.
Filed Nov. 15, 1960, Ser. No. 70,100
1 Claim. (Cl. 296—95)

This invention relates to improvements in windshield awnings and the supporting means for supporting the said awning, an object thereof being to provide a very simple and an improved awning structure adapted to engage the exterior lateral portion of the roof top of an automobile in spaced apart or in rain sealing engagement therewith.

Another object thereof is to provide a permanent, semipermanent, or a temporary and removable knockdown supporting structure for supporting an awning for full retraction when not adjustably extended for use over the windshield area, or easily and quickly removed from the roof top, and completely disassembled in a like manner for stowage in a small amount of space within the vehicle.

A still further and important object thereof is to provide protection to the windshield area from rain, sleet, snow, or the formation of ice thereon, and to provide clean and clear visibility for proper vision at all times when viewing outdoor movies at drive-in theatres and other outdoor events, thereby eliminating the continuous or the on and off use of the windshield wipers.

With these objects and still others in view, as will hereinafter more fully appear, the invention comprises certain novel constructions, combination and arrangement of parts, hereinafter described and claimed and illustrated in the accompanying drawings, in which:

Figure 1:
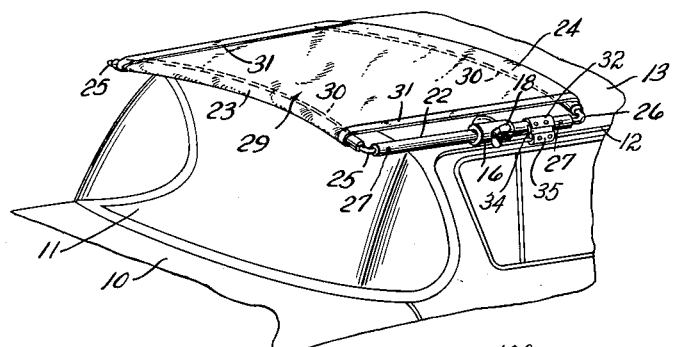
FIGURE 1 is a perspective view, in fragment, of the front portion of an automobile, the view including a perspective view of the awning and the supporting structure shown supported over the roof top.
Figure 2:
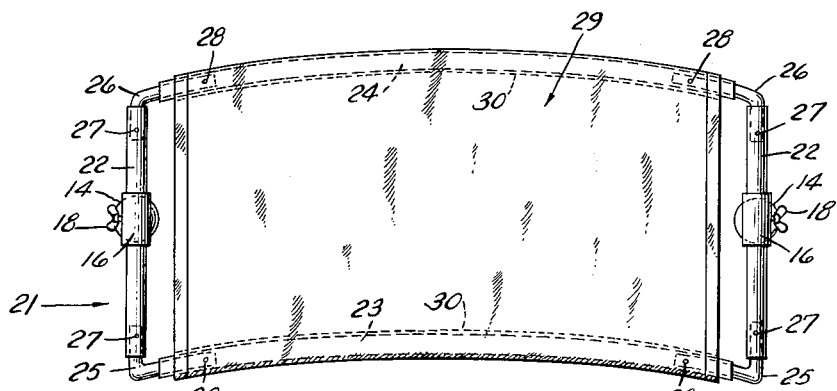
FIGURE 2 is a top plan view of the awning shown attached to the lateral cross members of the frame structure.
Figure 3:
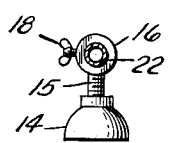
FIGURE 3 is an end elevation view of the longitudinal support supported above the vacuum cup.
Figure 4:
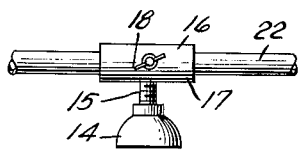
FIGURE 4 is a side elevation view of FIGURE 3, showing the supported longitudinal frame member.

Referring now more specifically to the drawings, attention is directed to FIGURES 1 and 2, wherein numeral 21 generally indicates the frame structure and numeral 29 generally indicates the awning structure.

In FIGURE 1, a portion of an automobile 10 is shown, with the awning structure 29 supported by the frame structure 21 above the roof top 13 and over the windshield area 11, supported in either spaced apart relationship or in rain sealing engagement with the said roof top.

Figure 5:
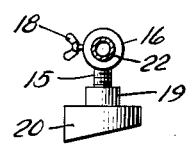
FIGURE 5 is a front elevation view, of a modified form of roof engaging means, in the form of a magnetized metal base member.

To support the awning structure 29, first, roof engaging means in the form of vacuum cups 14 are either removably or permanently attached to the roof top 13 at the desired location, laterally and longitudinally, as may be seen from FIGURE 1. The modified form of roof engaging means, FIGURE 5, in the form of a magnetized metal base member 20 having a separable rigid or flexible collar portion 19, may be used in place of the vacuum cups 14.

Attached to the roof engaging means 14 or 20, are the longitudinal tubular supports 16, each having a centrally disposed vertical threaded member 15 for adjustable attachment to the said roof engaging means. Vertical height adjustment of the frame structure 21, above the roof top, is obtained through the axial adjustment of the said threaded member 15.

Roof engaging means, and a variation of a frame and awning structure, are shown and described in my copending application, Serial No. 762,733, filed September 23, 1958, now Patent No. 2,984,300. My invention therefore, is concerned primarily with a modified form of a frame structure with a modified form of awning structure therefor.

In FIGURE 2, there is shown the frame structure 21 comprising, the two longitudinal side spaced members 22, the forward lateral member 23, and the rear lateral member 24, both lateral members being preferably contoured to the lateral contour of the roof top. The four frame members 22, 23 and 24, are removably and adjustably attached together to the angled corner engaging members 25 and 26, which provides the lateral and longitudinal adjustment of frame structure 21. Removable frame pins 27 and 28 may be used to secure together, any or all of the frame members 22, 23 and 24, either temporarily or permanently. Thumb screws 18 extending from the longitudinal supports 16 are used to adjustably secure the longitudinal members 22 of the frame structure 21, more particularly in the retracted position over the roof top, to provide complete and safe movement of the device while the vehicle is in motion.

The awning or panel structure 29 is provided with a forward lateral and a rear lateral hem 30 to engage the two removably attached lateral cross members 23 and 24, of the frame structure 21, for longitudinal and lateral support thereto. The awning 29 is therefore supported as a fully retractable taut supported awning or panel form, for longitudinal adjustment of the awning and frame structure over the windshield area and the roof top of the vehicle.

In the use of a flexible fabric awning, longitudinal reinforcing bands 31 are attached to the longitudinal edges thereof to reinforce the awning against wind pressure or any tensioned support. The awning, constructed of rigid or flexible material, is narrower in lateral width than the side spaced apart longitudinal frame members 22 and provides a fully retractable taut supported awning.

Figure 6:
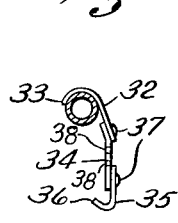
FIGURE 6 is an end elevation view of the frame clamping members.
Figure 7:
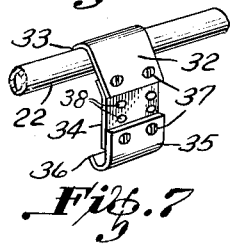
FIGURE 7 is a side elevation view of FIGURE 6.

In FIGURES 6 and 7, there are shown frame clamping members, upper clamping member 32 having an arcuate portion 33 to freely engage the longitudinal frame member 22. Attached to the said upper clamping member 32 is an adjustable strap 34 engaging the lower clamping member 35, each member being adjustably secured thereto by bolts 37 or other suitable fastening means adapted to engage the desired apertures 38, formed in the said strap 34. The arcuate portion 36 of lower clamping member 35 is adapted to engage the rain gutter 12 of the vehicle, as shown in FIGURE 1.

The upper clamping member 32 of adjustable clamping members 32 and 35 are adapted to engage the longitudinal frame member 22, preferably one for each of said frame member 22 and positioned aft of the longitudinal supports 16, to adjustably secure the frame structure 21 downwardly, and to provide forward and rearward angular adjustment thereof due to the forward overhang of the said frame structure 21. Additional clamping members, 32 and 35, when attached in pairs to a longitudinal frame member 22, with one pair forward and one pair aft of the longitudinal support 16, and with the awning 29 preferably in a retracted position, the complete device is then safely transported while the vehicle is in motion. The awning 29 is ready for instant use at all times when the structure is supported to the vehicle as a permanently attached device.

The awning 29 may be supported in spaced relation relative to the lateral contour of the roof top, or in rain sealing, or in friction supporting engagement therewith.

Vertical height adjustment of the frame structure 21 above the roof top, or the amount of overhang forwardly or rearwardly of the longitudinal supports 16, or the use of the clamping members 32 and 35, governs the manner in which the awning 29 may be supported relative to the roof top of the vehicle.

To retract the taut supported awning or panel 29, the thumb screws 18, if used, are released from engaging the longitudinal frame members 22. When the clamping members 32 and 35 are used, the lower clamping member 35 may be temporarily released from the rain gutter 12, if the tension is too great, to permit retractable movement of frame members 22. The frame structure 21 is then manually retracted, from within the vehicle, upon grasping each longitudinal frame member 22 and moving the said members 22 rearwardly. The awning 29, in this manner, is fully retractable over the roof top in the taut supported form.

The simplicity in the structure of the device; the simplicity and the ease in the erection and structural assembly, and the operation and use thereof; and combined with the extreme viewing pleasure, comfort and safety; all this enjoyed and benefited by both management and the patrons during inclement weather, while viewing outdoor movies or the like.

Therefore, clear and total windshield vision is provided without any on or off or continuous automobile engine noise, or windshield wiper blur or streaks, or windshield wiper or engine noise caused by the automobile or the adjacent parked automobiles.

While certain embodiments of my invention have been disclosed in the foregoing description, it will be understood that various modifications may occur to those skilled in the art. Changes, therefore, in the construction and arrangement, may be made without departing from the spirit and the scope of the invention as disclosed in the appended claim.

I claim:

An adjustable rain awning structure supported over the roof top and the windshield area of an automobile, comprising frame supporting means having a longitudinal tubular supporting member and a vertically disposed threaded member, a vacuum cup threadably engaging and adjustably supporting the said vertical threaded member for the adjustable movement of said longitudinal supporting member, a longitudinally retractable rectangular shaped frame structure having the side longitudinal frame members thereof engaging the said side longitudinal supporting members of said frame supporting means for adjustable support therefrom, a taut supported awning retractable and extendable in the said taut supported form, said awning being narrower in lateral width than the opposing forward and rear lateral frame members of said frame structure and supported to only the said lateral frame members, and a vertically adjustable clamping member having an upper clamping portion engaging the side longitudinal frame member of said frame structure, a separable lower clamping portion adapted to engage the rain gutter, and a connecting member adjustably connecting said upper and lower clamping portions, said connecting member having vertically spaced apart apertures and provided with threaded fastening means to adjustably engage the said upper and the said lower spaced apart clamping portions to provide longitudinally angular adjustment of said frame structure above the roof top upon the vertical adjustment of said clamping portions on the said connecting member.

References Cited in the file of this patent
UNITED STATES PATENTS

| | | |
|---|---|---|
| 140,972 | Turnbull | July 15, 1873 |
| 1,305,515 | Bessolo | June 3, 1919 |
| 2,783,082 | Genua | Feb. 26, 1957 |
| 2,812,208 | Francis | Nov. 5, 1957 |
| 2,948,288 | Nelson | Aug. 9, 1960 |
| 2,984,300 | Francis | May 16, 1961 |